US012769317B2

(12) United States Patent
Smieja et al.

(10) Patent No.: US 12,769,317 B2
(45) Date of Patent: Oct. 20, 2026

(54) COORDINATED MANEUVERS OF WORK MACHINES

(71) Applicant: Caterpillar Paving Products Inc., Brooklyn Park, MN (US)

(72) Inventors: Jameson M. Smieja, Mound, MN (US); Eric S. Engelmann, Delano, MN (US); Timothy J. Sturos, Brooklyn Park, MN (US); Elizabeth R. K. Brockman, Charlotte, NC (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 231 days.

(21) Appl. No.: 18/226,804

(22) Filed: Jul. 27, 2023

(65) Prior Publication Data

US 2025/0036125 A1 Jan. 30, 2025

(51) Int. Cl.
*G05D 1/695* (2024.01)
*G05D 1/00* (2006.01)

(52) U.S. Cl.
CPC .................................. *G05D 1/0293* (2013.01)

(58) Field of Classification Search
CPC .... G05D 1/0293; G05D 1/695; G05D 1/6985; G05D 2105/05; G05D 2107/90; G05D 2109/10
See application file for complete search history.

(56) References Cited

U.S. PATENT DOCUMENTS

| | | | |
|---|---|---|---|
| 9,267,249 B2 | 2/2016 | Simon | |
| 9,957,675 B2 | 5/2018 | Marsolek et al. | |
| 10,526,755 B2 | 1/2020 | Engelmann | |
| 10,949,786 B2 | 3/2021 | Marsolek et al. | |
| 11,273,752 B2 | 3/2022 | Anderson et al. | |
| 2013/0076101 A1* | 3/2013 | Simon | E01C 19/004 701/29.3 |
| 2014/0193234 A1* | 7/2014 | Kormann | A01D 43/073 701/50 |
| 2016/0053445 A1* | 2/2016 | Berning | B65G 67/22 299/1.5 |
| 2016/0084957 A1* | 3/2016 | Krug | B60W 30/16 701/96 |
| 2016/0170415 A1* | 6/2016 | Zahr | E01C 19/002 701/23 |

(Continued)

FOREIGN PATENT DOCUMENTS

| | | |
|---|---|---|
| DE | 102011114185 A1 | 3/2013 |
| DE | 102012215005 A1 | 2/2014 |
| DE | 102014216603 A1 | 2/2016 |

OTHER PUBLICATIONS

U.S. Appl. No. 10/526,755, filed Nov. 14, 2005, 87 pages.

*Primary Examiner* — Scott A Browne
*Assistant Examiner* — Rami Nabih Bedewi

(57) ABSTRACT

A work machine discharges material through a discharge port at a moving discharge target in a coordinated maneuver during which the discharge target is confined to a bounded area. A distance control mechanism selects path information to a dwell location of the coordinated maneuver. Sensors generate respective signals by which a relative position of the discharge port to the bounded area are indicated during the coordinated maneuver. A messenger indicates the selected path information to compel relocation of the bounded area according thereto.

17 Claims, 5 Drawing Sheets

(56) References Cited

U.S. PATENT DOCUMENTS

| | | | | |
|---|---|---|---|---|
| 2017/0130405 | A1 | 5/2017 | Engelmann | |
| 2018/0298569 | A1* | 10/2018 | Engelmann | B65G 67/22 |
| 2019/0377363 | A1* | 12/2019 | Shelton | E01C 19/004 |
| 2020/0109528 | A1* | 4/2020 | Berning | E01C 23/088 |
| 2020/0262428 | A1* | 8/2020 | Fritz | B60W 10/04 |
| 2020/0319632 | A1* | 10/2020 | Desai | A01B 69/008 |
| 2021/0333802 | A1* | 10/2021 | Singh | A01D 41/1278 |
| 2024/0302198 | A1* | 9/2024 | Missotten | A01D 41/127 |

* cited by examiner

COORDINATED MANEUVERS OF WORK MACHINES

TECHNICAL FIELD

The present disclosure relates generally to vehicle guidance and positioning and more specifically to coordinated maneuvers of work machines, such as between a milling machine and a hauling truck for pavement milling.

BACKGROUND

Pavement milling is a surface preparation process by which old pavement is removed in anticipation of replacement by new material. Generally, pavement milling is achieved by a pair of construction machines, one to remove the old pavement, referred to herein as a milling machine or a cold planer, and one to capture the removed material for further dispensation, referred to herein as a hauling machine. Typically, pavement is removed by a rotary cutter installed on the milling machine and is conveyed to an elevated chute from which it is ejected. The removed material is ejected from the chute and becomes airborne along a projectile trajectory that terminates in the bed of the hauling machine. The coordinated maneuver performed by the operator of the milling machine and that of the hauling machine is a dance that seeks to maintain relative movement between the two pieces of equipment so that the projectile trajectory terminates at target locations in the hauling machine bed. Skilled operators can maintain relative speed and position so that the target locations change over the maneuver and the ejected pavement is distributed across the bed of the hauling machine. Moreover, skilled operators can perform the maneuver with minimal stopping of either vehicle. It would be desirable if these same maneuvers could be accomplished by operators of lesser skill, or in a manner that reduces the workload on the skilled operators.

Various mechanisms have been employed to assist machine operators in performing the coordinated pavement milling maneuver described above. U.S. Pat. No. 10,526,755, for example, discloses a truck position control system for milling operations. The control system may include a sensor that indicates speed of a mobile machine and/or a distance between the mobile machine, such as a pavement milling machine, and a receptacle, such as a bed on a hauling machine. A display system presents information to an operator of the receptacle relating to the mobile machine and the receptacle. A controller determines a relative speed of the receptacle with respect to the mobile machine based at least in part on the sensor signal and generates a visual indicator on the display system that indicates the relative speed of the receptacle with respect to the mobile machine.

U.S. Pat. No. 11,273,752 is directed to an illumination control system for a first mobile machine used in cooperation with other mobile machines. The illumination control system controls an illumination lamp disposed on the first mobile machine so as to be directed in its travel direction. The illumination control system also includes a positioning/location device disposed on the first mobile machine configured to determine a proximate distance of the first mobile machine with respect to a second mobile machine traveling in the travel direction to cooperatively interact with the first mobile machine in conducting an operation. An electronic controller may be configured to adjust the illumination lamp disposed on the first mobile machine based on the proximate distance as determined.

U.S. Pat. No. 9,267,249 is directed to a work train comprising a milling device and a transport device with a sensor device for distance monitoring, a milling device with a sensor device and method for distance monitoring with a work train. An automatic distance monitor monitors the distance between the transport device and the milling device. The distance monitor displays the actual measured distance and then the operator of the milling device transmits commands to the driver of the transport device.

While the foregoing sample of art illustrates some solutions by which machine operators can maneuver work machines, research, engineering, and product development efforts continue to be devoted to improving efficiency in such efforts as pavement milling through improved techniques of performing such maneuvering.

SUMMARY

In one aspect of the present inventive concept, a work machine discharges material through a discharge port at a moving discharge target in a coordinated maneuver during which the discharge target is confined to a bounded area. A distance control mechanism selects path information to a dwell location of the coordinated maneuver. Sensors generate respective signals by which a relative position of the discharge port to the bounded area are indicated during the coordinated maneuver. A messenger indicates the selected path information to compel relocation of the bounded area according thereto.

In another aspect, a system performs a coordinated maneuver among work machines. One work machine includes an update timer that generates a timing signal that is compliant with operator selectable signal parameters. A messenger is coupled to the update timer and changes a messenger state in accordance with a state of the timing signal defined by the signal parameters. Sensors generate respective signals by which a position of the work machine relative to another work machine is indicated during the coordinated maneuver, where the other work machine traverses a trajectory over which the coordinated maneuver is performed in response to the messenger as individual maneuver relocations and interposing dwell locations at which the other work machine is stationary.

In yet another aspect of the present inventive concept, a method performs a coordinated maneuver among work machines. A timing signal is generated that is compliant with operator selectable signal parameters. A messenger is activated in accordance with a state of the timing signal defined by the signal parameters and is deactivated in accordance with another state of the timing signal defined by the signal parameters. A work machine is propelled to follow a trajectory over which the coordinated maneuver is performed in response to the messenger as individual maneuver relocations and interposing dwell locations at which the work machine is stationary. Material is accepted at a discharge target that is defined by a position of the work machine relative to another work machine from which the material is discharged.

In a further aspect of the present inventive concept, a system is constructed to perform a coordinated maneuver among work machines. A work machine in the system includes a distance control mechanism to select path information to a dwell location of the coordinated maneuver. Sensors in the work machine generate respective signals by which a relative position of the discharge port to the bounded area is indicated during the coordinated maneuver. The work machine also includes a messenger that indicates the selected path information to compel relocation of the bounded area according thereto. The work machine further comprises a transmitter that transmits the selected path data to a receiver in another work machine that is constructed to receive the selected path data. The other work machine includes an automatic drive constructed to propel the other work machine to the dwell locations in accordance with the selected path data.

DETAILED DESCRIPTION

Figure 1:
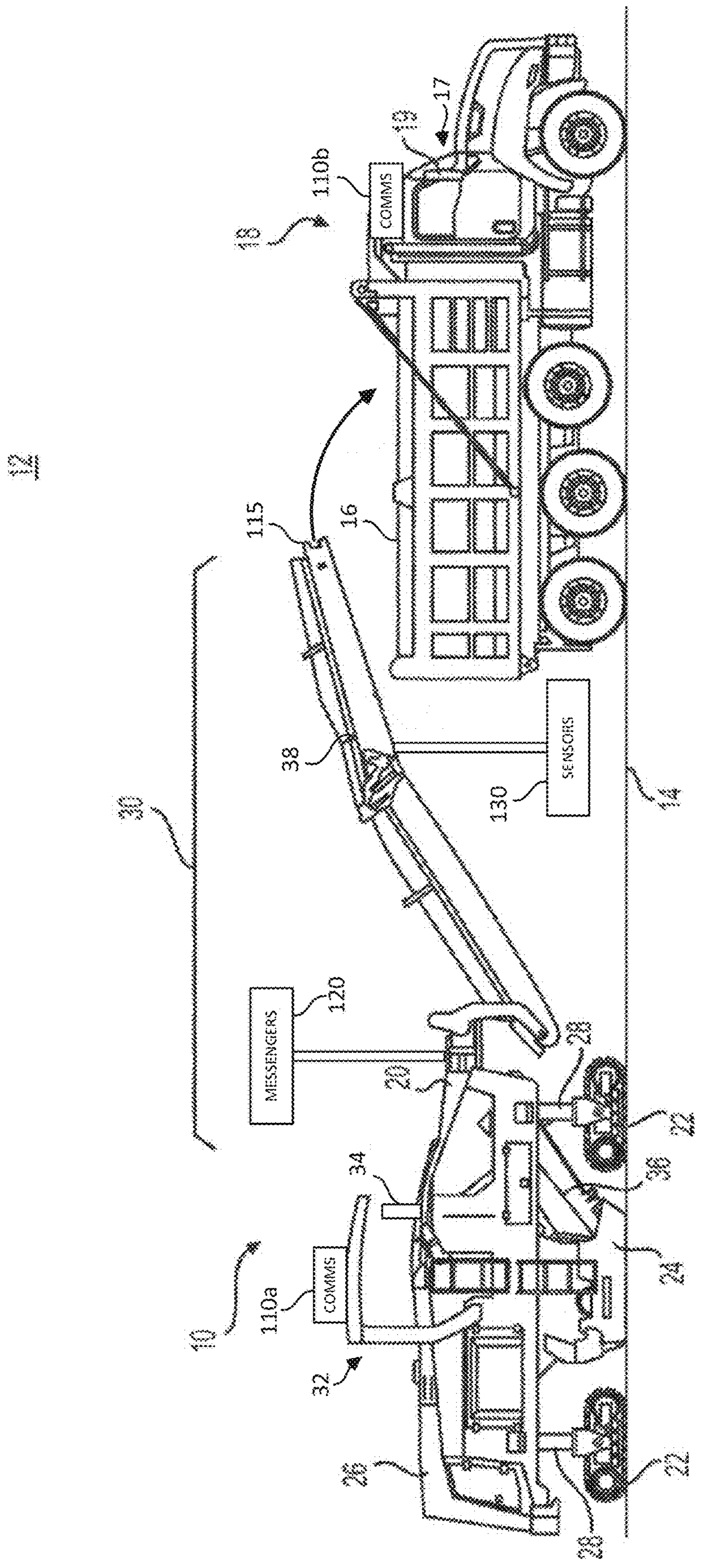
FIG. 1 is an illustration of a configuration of work machines in which the present inventive concept may be embodied.

The present inventive concept is best described through certain embodiments thereof, which are described in detail herein with reference to the accompanying drawings, wherein like reference numerals refer to like features throughout. It is to be understood that the term inventive concept and the term invention, when used herein, are intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to coordinated maneuvers by which a work machine, such as a milling machine, that signals another work machine, such as a hauling machine, to start and stop such that discharged material is distributed throughout the hauling machine bed, in accordance with a signal that can be modified by the work machine operator based on machine operating changes. Upon review of this disclosure and appreciation of the concepts disclosed herein, the ordinarily skilled artisan will recognize other contexts in which the present inventive concept can be applied. The scope of the present invention is intended to encompass all such alternative implementations.

FIG. 1 is an illustration of a configuration of work machines in which the present inventive concept may be embodied. A milling machine 10 (also referred to as a cold planer) is employed at a worksite 12, such as, for example, a roadway over which milling operations are conducted. As part of the milling operation, milling machine 10 may mill a surface 14 of the roadway and transfer milled material into a bed 16 of a hauling machine 18. Hauling machine 18 may be controlled by an operator from within an operator station 17 thereof. The hauling machine operator may use mirrors 19 attached to hauling machine 18 and one or more control devices (e.g., a throttle control, a braking control, a steering device, etc.) within operator station 17 to cause hauling machine 18 to travel in front of or alongside milling machine 10 to receive milled material as hauling machine 10 traverses surface 14. When bed 16 has reached capacity, hauling machine 18 may depart from milling machine 10 to deliver the milled material to a storage site, processing plant, or other facility, and a second hauling machine may position itself relative to milling machine 10 in replacement of hauling machine 18 so the milling operation can continue.

Milling machine 10 may have a frame 20 supported by one or more traction devices 22, and a drum housing 24 in which a milling drum is installed that may include a plurality of cutting tools for breaking up surface 14. An engine 26 mounted to frame 20 may be configured to drive traction devices 22, the milling drum within drum housing 24, and/or other components. Traction devices 22 may include wheels or tracks connected to actuators 28 that raise and lower frame 20 relative to surface 14. It is to be noted that raising and lowering frame 20 may also function to vary the depth at which the milling drum cuts into surface 14. In some embodiments, the same or different actuators 28 may also be used to steer milling machine 10 and/or to adjust a travel speed of traction devices 22 (e.g., to speed up or brake traction devices 22). A chute assembly 30 may be pivotally connected to frame 20 at a forward end thereof and constructed to transport material away from drum housing 24 towards a discharge port 115 and into a receptacle, such as hauling machine 18. Other milling machine configurations (e.g., rear-loading) and/or types of receptacles may be used without departing from the spirit and intended scope of the present inventive concept.

Frame 20 may also support an operator station 32 in which any number of interface devices 34 may be used to control milling machine 10. Interface devices 34 may include, among other things, one or more displays, warning devices, and input devices (e.g., buttons, levers, dials, switches, knobs, keyboards, touch screen devices, pedals steering wheels, etc.). Exemplary interface devices, or equivalently operator controls, are described below.

Chute assembly 30 may include a first conveyor 36 communicatively coupled to drum housing 24 and may be configured to transfer milled material to a second conveyor 38. Conveyor 38 may be pivotally attached to frame 20 to vary the height at which milled material leaves conveyor 38. Conveyor 38 may also be pivotally attached to frame 20 to vary the lateral location at which milled material leaves conveyor 38.

Embodiments of the present inventive concept may be constructed or otherwise configured to support a coordinated maneuver of work machines, e.g., milling machine 10 and hauling machine 18. To that end, milling machine 10 may include one or more messengers 120 by which the hauling machine 18 is instructed to move to different locations on surface 14. As used herein, the term "messenger" is intended to refer to mechanisms by which one work machine participating in a coordinated maneuver indicates to another work machine to proceed to the next phase or stage of that maneuver. Messengers may include semaphores such as signaling lamps, audio devices such as horns, radio devices such as transmitters, and so on. In some embodiments, performance of the coordinated maneuver occurs over radio waves, optical signals, etc., between a communications device 110*a* installed on milling machine 10 and a communications device 110*b* installed on hauling machine 18. Examples of such are provided below.

Sensors 130 may be installed on milling machine 10 that generate signals by which the milling machine operator is informed of aspects of the coordinated maneuver, e.g., position of milling machine 10 relative to hauling machine 18, the fill state of hauling machine 18, among others.

Figure 2A:
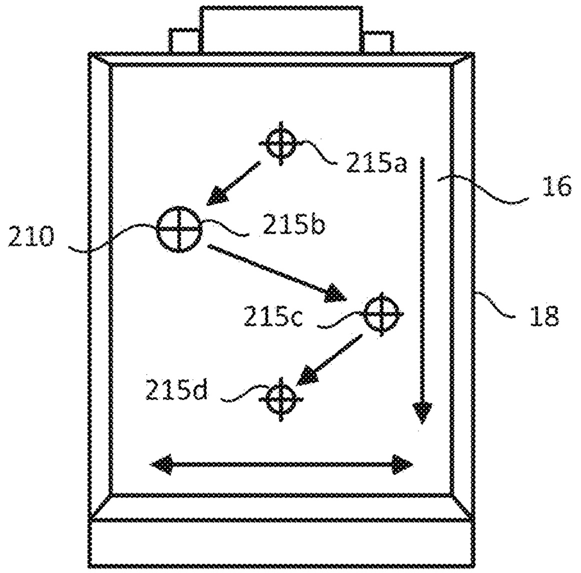
FIG. 2A is an illustration taken from overhead of a hauling machine participating in an exemplary coordinated maneuver embodiment of the present inventive concept.

FIG. 2A is an illustration of a hauling machine 18 participating in an exemplary coordinated maneuver embodiment of the present inventive concept. Milling machine 10 may advance in the direction of milling operations while hauling machine 18 remains stationary (although milled material may be deposited while hauling machine 18 is in motion as well). In so doing, the location in bed 16 of a discharge target 210 changes, illustrated as if changing position at discharge target positions 215*a*-215*d*, representatively referred to herein as target position(s) 215, at which milled material accumulates. The milled material deposited at target positions 215 may accumulate in accordance with such factors as milling machine cut depth, milling machine conveyor speed, milling machine advancement speed, etc. Additionally, accumulation at different target positions 215 may be determined by spatial position of chute discharge port 115. For example, chute discharge port 115 may be rotated on frame 20 normally to bed 16 (raising and lowering) whereby a mound spread, indicated in the figure by circles of different diameters, may be defined. Additionally, chute discharge port 115 may rotate transversely to bed 16 (swinging left and right) by which lateral positions of the discharge targets 215 are defined.

Figure 2B:
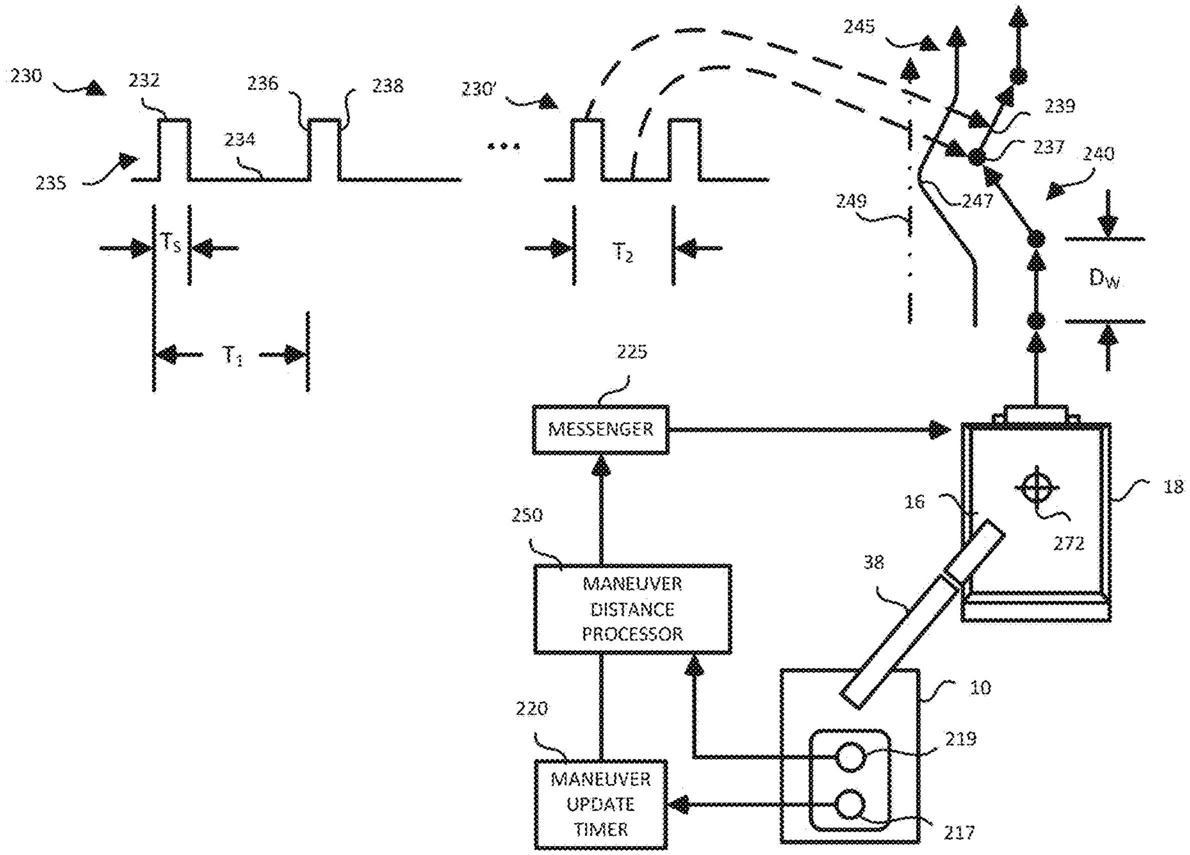
FIG. 2B is an illustration of exemplary maneuver timing by which the present inventive concept can be embodied.

FIG. 2B is an illustration of exemplary maneuver timing by which the present inventive concept can be embodied. Milling machine 10 and hauling machine 18 may proceed along a trajectory 245 that generally follows a milling path but that is traveled through coordinated maneuver 240. In certain embodiments, exemplary coordinated maneuver 240 may comprise sequential maneuver relocations, representatively illustrated at maneuver relocation 239, and interposing dwell locations, representatively illustrated at dwell location 237. Dwell locations 237 and maneuver relocations 239 may be defined so that milling machine 10 deposits milled material at a discharge target 272 in bed 16 of hauling machine 18. That is, hauling machine 18 may be operated to each dwell location 237 terminating each maneuver relocation 239, at which milling machine 10 moves forward to distribute the milled material over bed 16. It is to be understood that milling machine 10 may operate independently of any relocation and dwell location requirements imposed on hauling machine 18.

In the illustrated embodiment, the operator of hauling machine 18 may move to the next dwell location 237 through a corresponding maneuver relocation 239 in response to a messenger 225 controlled at milling machine 10. In one embodiment, mechanisms may be included by which units of distance, e.g., feet and inches, are messaged between work machines. For example, milling machine 10 may be equipped with a maneuver distance processor 250 that is communicatively coupled to a control 219 available to the operator of milling machine 10 for selecting a distance $D_W$ between dwell locations 237. A suitable signal may be conveyed from control 219 to maneuver distance processor 250 that compels messenger 225 to display, for example, "Move Ahead $D_W$ Feet," where $D_W$ may be selected by control 219.

The operator of milling machine 10 may have an additional control 217 for selecting the length of regular intervals at which the desired travel distance for the hauling machine 18, e.g., $D_W$ feet is, displayed on messenger 225. For example, milling machine 10 may be outfitted with a maneuver update timer 220 that produces a timing signal, such as timing signal 230. Exemplary timing signal 230 may be defined by signal parameters that can be controlled by the milling machine operator. In the illustrated example, timing signal 230 is a square wave with period of $T_1$ comprising a high or activation state 235 over time period $T_S$, having amplitude 232 relative to a base level between its rising edge, representatively illustrated at rising edge 236, and its falling edge, representatively illustrated at falling edge 238. Timing signal 230 may further define a low or deactivation state 234 over the time period $T_1$-$T_S$ having an amplitude at base level.

As indicated above, milling machine 10 may comprise an operator control 217 by which timing signal 230 can be modified. For example, operator control 217 may provide a signal to maneuver update timer 220 responsive to which period $T_1$ is temporally shortened to period $T_2$ in timing signal section 230', for example. In various embodiments, messenger 225, such as a graphical sign, a signaling lamp, a horn, etc., may be activated on rising edge 236 and extinguished on falling edge 238. Hauling machine 18 may propel itself under the control of the hauling machine operator through a maneuver relocation 239 to the next dwell location 237 according to instructions conveyed by the activated messenger 225. In certain embodiments, messenger 225 may remain active over the duration of $T_S$ during which time hauling machine 18 traverses maneuver relocation 239. Once messenger 225 is extinguished, hauling machine 18 may cease its movement along trajectory 245 at the next dwell location 237 of coordinated maneuver 240 and remain at that dwell location 237 until the next activation of messenger 225. Alternative messenger signaling techniques, such as those indicating instructions that vary from interval to interval, may also be used as will be appreciated by skilled technicians. For example, the operator of milling machine 10 may have a control through which a suitably equipped semaphore, e.g., left and right arrow signal lamps, can indicate to the operator of hauling machine 18 the direction in which to steer to reach the next dwell location 237. Such an adjustment, representatively illustrated at curve 247 on trajectory 245, may be made, for example, when the operator of milling machine 10 wants to change the lateral position of discharge target 272 without rotating chute 38. That is, as hauling machine 18 traverses curve 247, milling machine 10 may proceed on a more direct (less curved) path, representatively illustrated at path 249, thereby altering the relative position of the distal end of chute 38 with the boundaries of bed 16 and, consequently, the location of the discharge target 272 in bed 16. In the illustrated example, the result of hauling machine 18 proceeding around curve 247 and milling machine 10 proceeding on the more direct path 249 with chute 38 in a fixed angular position, is the shift of the location of discharge target 272 towards the outer rails of bed 16 (towards the right when viewed into the drawing page). For purposes of definition, such an adjustment achieved by one work machine, e.g., hauling machine 18, veering away from the trajectory of another work machine, e.g., milling machine 10, is to be considered a coordinated maneuver of those work machines when the veering away is directed by the other work machine (milling machine 10) as both work machines 10 and 18 perform a common task requiring the coordination therebetween.

Figure 3:
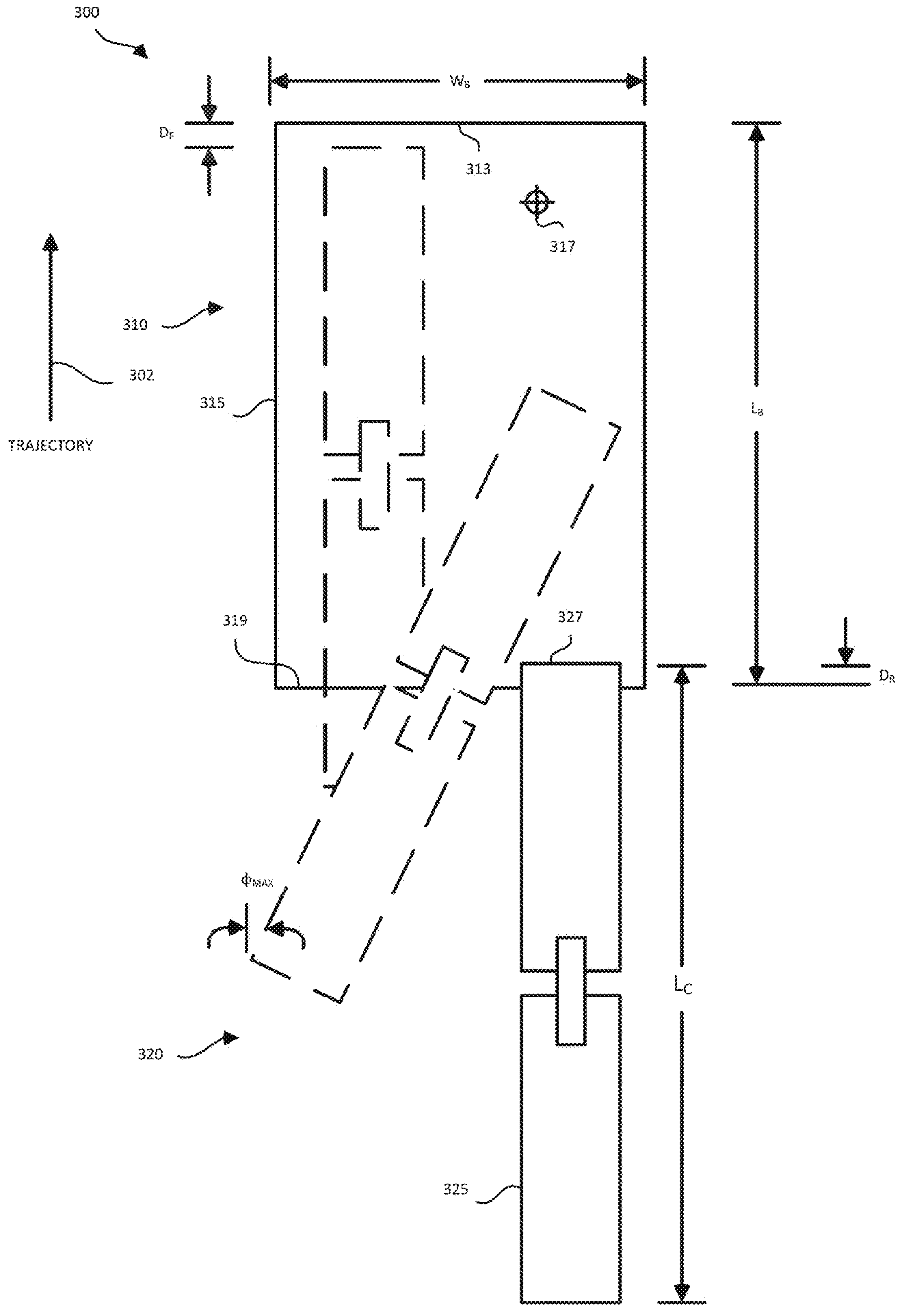
FIG. 3 is a block diagram of an exemplary system of work machines by which the present inventive concept can be embodied.

FIG. 3 is a block diagram of an exemplary system 300 of work machines by which the present inventive concept can be embodied. Exemplary system 300 comprises a hauling machine 310 of which only bed 315 is illustrated and a milling machine 320 of which only chute 325 is illustrated. Both work machines 310, 320 may perform a work task, e.g., road surface milling, along a general trajectory 302. As discussed above, trajectory 302 may be traversed through a coordinated maneuver in which hauling machine 310 cycles between generally forward motion (including with the veering implementation described above), e.g., maneuver relocations, and being stationary, e.g., at dwell locations. As this occurs, milled material is discharged from chute 325 at a distal discharge end 327 thereof towards a discharge target 317 that changes location as the coordinated maneuver is performed. That is, discharge target 317 may be dependent on the relative position of discharge end 327 with bed 315 and the projectile trajectory of the milled material. Discharged milled material may be deposited in bed 315 at the dwell locations during which time milling machine 320 advances along trajectory 302 and deposits milled material in bed 315.

As illustrated in FIG. 3, exemplary bed 315 may be WB wide (the dimension thereof perpendicular to trajectory 302) and $L_B$ long (the dimension thereof parallel to trajectory 302), and exemplary chute 325 may be $L_C$ long. In certain embodiments, limits on the relative positions of discharge end 327 and the confines of bed 315, e.g., the area $W_B \times L_B$ bounded by the periphery of bed 315, may be established that, when heeded, can prevent milled material from being discharged outside of bed 315. For example, as illustrated in the figure, a distance $D_F$ may establish the minimum allowable gap between chute end 327 and forward bed edge 313 (FIG. 3 shows chute 235 in phantom to better illustrate its corresponding forwardmost position), a distance $D_R$ may establish the minimum allowable gap between chute end 327 and rearward bed edge 319, and an angle $\phi_{MAX}$ may establish the maximum angle between chute 325 and bed 315 (chute 235 is again shown in phantom to better illustrate angle $\phi_{MAX}$). It is to be understood that FIG. 3 is not drawn to any scale and may not reflect the projectile trajectory of the discharged material. As such, $D_F$ and $D_R$ may be further rearward than illustrated with the possibility of $D_R$ being defined outside the confines of bed 315. The parameters $W_B$, $L_B$, $L_C$, $D_F$, $D_R$, $D_W$ and $\phi_{MAX}$ may be stored in memory and retrieved by computational resources of milling machine 320 for purposes of control over the coordinated maneuver. For example, messages displayed on messenger 225, for example, may provide instructions to hauling machine 310 as to how to steer to the next dwell location 237 from computations using those parameters. Moreover, similar computations may be used in autonomous drive configurations, such as those exemplified below.

Figure 4:
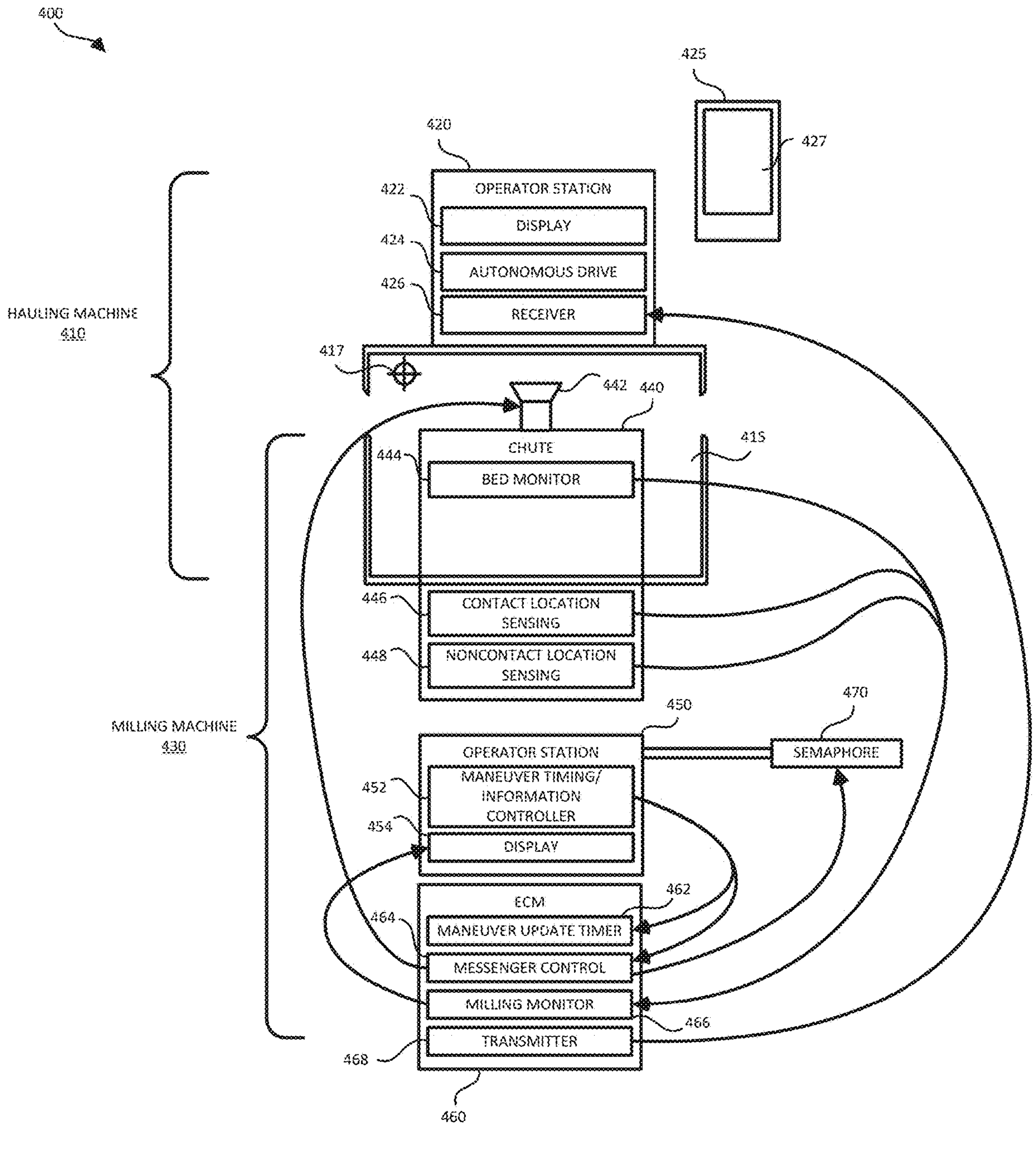
FIG. 4 is a schematic block diagram of an exemplary set of work machines equipped to practice the present inventive concept.

FIG. 4 is a schematic block diagram of an exemplary set 400 of work machines equipped sufficiently to practice the present inventive concept. Specifically in the illustrated embodiment, exemplary set 400 comprises a hauling machine 410 and a milling machine 430, each having functional components by which a coordinated maneuver may be performed as described in this disclosure.

Certain functional components of exemplary milling machine 430 may be communicatively coupled to electronic control module (ECM) 460. ECM 460 may be implemented through hardware or a combination of hardware and software to process data provided by functional components thereof and to provide data processing results that inform participants in the coordinated maneuver.

Exemplary milling machine 430 includes a chute 440 from which milled material is discharged as described above. In certain embodiments, such as that illustrated in FIG. 3, chute 440 may have various components coupled thereto that perform functions for carrying out a coordinated maneuver. For example, chute 440 may include a bed monitor 444 that may generate one or more signals from which the operator of milling machine 430 is kept aware of the distribution of milled material in bed 415 of hauling machine 410. In one implementation, bed monitor 444 may include one or more optical sensors, such as a camera, that generates video data for presentation on display 454 at operator station 450. Information presented on display 454 may include imagery of a discharge target 417 and surrounds in bed 415 at which the milled material accumulates. Here, the terms "discharge target and surrounds," "at and about a discharge target," and other similar terms are intended to refer to a region within bed 415 of hauling machine 410 that includes the discharge target 417. Certain embodiments may employ a stereo camera in bed monitor 444 that generates three-dimensional video data from which the milling machine operator can judge depth, such as the height of a mound of milled material at a particular target. Additionally, bed monitor 444 may include reticles, sights and other aiming guides that assist the milling machine operator in locating the discharge target 417 in bed 415.

Milling machine 430 may include mechanisms by which its proximity to hauling machine 410 can be assessed. For example, a contact location sensor 446 may be installed on chute 440 at a position thereon that considers the dimensions of bed 415. That is, contact location sensor 446 may be positioned on chute 440 to be activated when limit $D_F$ (see FIG. 3) is reached. Contact location sensor 446 may be implemented in a mechanical switch that comes into contact with bed 415 and generates a signal responsive to reaching limit $D_F$. Such a signal may be reflected in information presented on display 454 to inform the operator of milling machine 430 that the forward limit has been reached. A similar sensor arrangement may be placed to sense reaching the rearward limit $D_R$ as well; although, as stated above, $D_R$ may lie outside the confines of bed 415 and noncontact sensor solutions may be preferable when this feature is to be implemented.

Additionally or alternatively, a noncontact location sensor 448 may be installed on chute 440 that may provide more proximity data than the contact location sensor 446. Noncontact location sensor 448 may be implemented through one of several remote sensing techniques such as radar, lidar, sonar, optical cameras and/or similarly functional devices. Advantageously, noncontact location sensor 448 may provide location data that is beyond the capabilities of contact location sensor 446. For example, data provided by noncontact location sensor 448 may indicate when $D_F$ is reached as well as when $D_R$ is reached. Moreover, noncontact location sensor 448 may provide continuous data indicative of the distance between milling machine 430 and hauling machine 410. Such continuous location data may be used to inform what visual data will be displayed on semaphore 470, which, with horn 442, are examples of messengers defined elsewhere herein. A remote communication device 425, e.g., a cellular phone, executing a suitable app, for example, that presents to the hauling machine operator on display 427 the same visual data may also be considered a messenger. Additionally, such continuous location data may be provided to automate not only the displayed information, but also to automate the driving control of hauling machine 410.

As illustrated in FIG. 4, data generated by bed monitor 444, contact location sensor 446 and noncontact location sensor 448 may be conveyed to ECM 460 for data processing and corresponding control activities. ECM 460 may be implemented in processing and memory circuitry that is sufficient to practice the present inventive concept. As such, ECM 460 may include a wide variety of processor and memory technologies without departing from the spirit and intended scope of the present inventive concept.

ECM 460 may include a milling monitor component 466 to which data are provided including the aforementioned data generated by bed monitor 444, contact location sensor 446 and noncontact location sensor 448. Additionally, milling monitor component 466 may include data processing resources by which the performance of the coordinated maneuver is monitored, and controlled. Moreover, milling monitor component 466 may provide continuous milling operation information on display 454 and possibly display 422 at operator station 420 of hauling machine 410 as will be discussed further below.

ECM 460 may include a maneuver update timer 462 constructed to produce a timing signal as described with reference to FIG. 2B. Accordingly, maneuver update timer 462 may include circuitry by which the timing signal is derived from a system clock according to operator controlled parameters. Such parameters may be established by a maneuver timing/information controller 452 at operator station 450. Maneuver timing controller 452 may be implemented through a variety of user controls including knobs, levers, sliding controls and controls implemented on display 454 that allow the milling machine operator to modify the timing parameters at which information is provided to the hauling machine operator, as well as to modify the content of that provided information (the veering direction, for example). The operator selections indicated through maneuver timing/information controller 452 may be conveyed to maneuver update timer 462, which may modify its timing signal accordingly, and to messenger control component 464, which may modify the displayed content accordingly.

The timing signal generated by maneuver update timer 462 may be provided to signaling control component 464 of ECM 460 by which signaling to hauling machine 410 is managed. For example, messenger control component 464 may activate a semaphore 470 that is mechanically coupled to milling machine 430 and is visible to the hauling machine operator, such as by way of mirrors located on hauling machine 410. Semaphore 470 may be implemented through signal lamps that illuminate upon activation and that extinguish upon deactivation. In an alternative embodiment, semaphore 470 may include lamps of different colors, such as a green lamp that illuminates to indicate a maneuver relocation and a red lamp that illuminates to indicate a dwell location. Semaphore 470 may include other indicators such as directional arrows, or may be constructed or otherwise configured as a video display presenting variable and rich content to inform the hauling machine operator. Other optical indicators may be used without departing from the spirit and intended scope of the present inventive concept. In addition, or, as discussed above, as an alternative to optical or visual manifestations of semaphore 470, milling machine 430 may have a horn 442 installed thereon that emits an audible signal upon activation thereof and that is silent upon deactivation thereof. Accordingly, the audible signal emitted by horn 442 may be activated and deactivated in accordance with the timing signal generated by maneuver update timer 462 in a manner similar to that of semaphore 470.

Certain embodiments provide for transmission of data related to the coordinated maneuver from a transmitter 468 at milling machine 430 to a receiver 426 at hauling machine 410. For example, data indicative of when hauling machine 410 is to proceed to the next dwell location through a maneuver relocation may be transmitted from milling machine 430 to hauling machine 410 where it may be presented on display 422, or on display 427 on remote device 425, at operator station 420. In one embodiment, these transmitted data may be provided to an autonomous drive 424 constructed to propel hauling machine 410 without human intervention but in compliance with parameters of the coordinated maneuver transmitted from milling machine 430.

Figure 5:
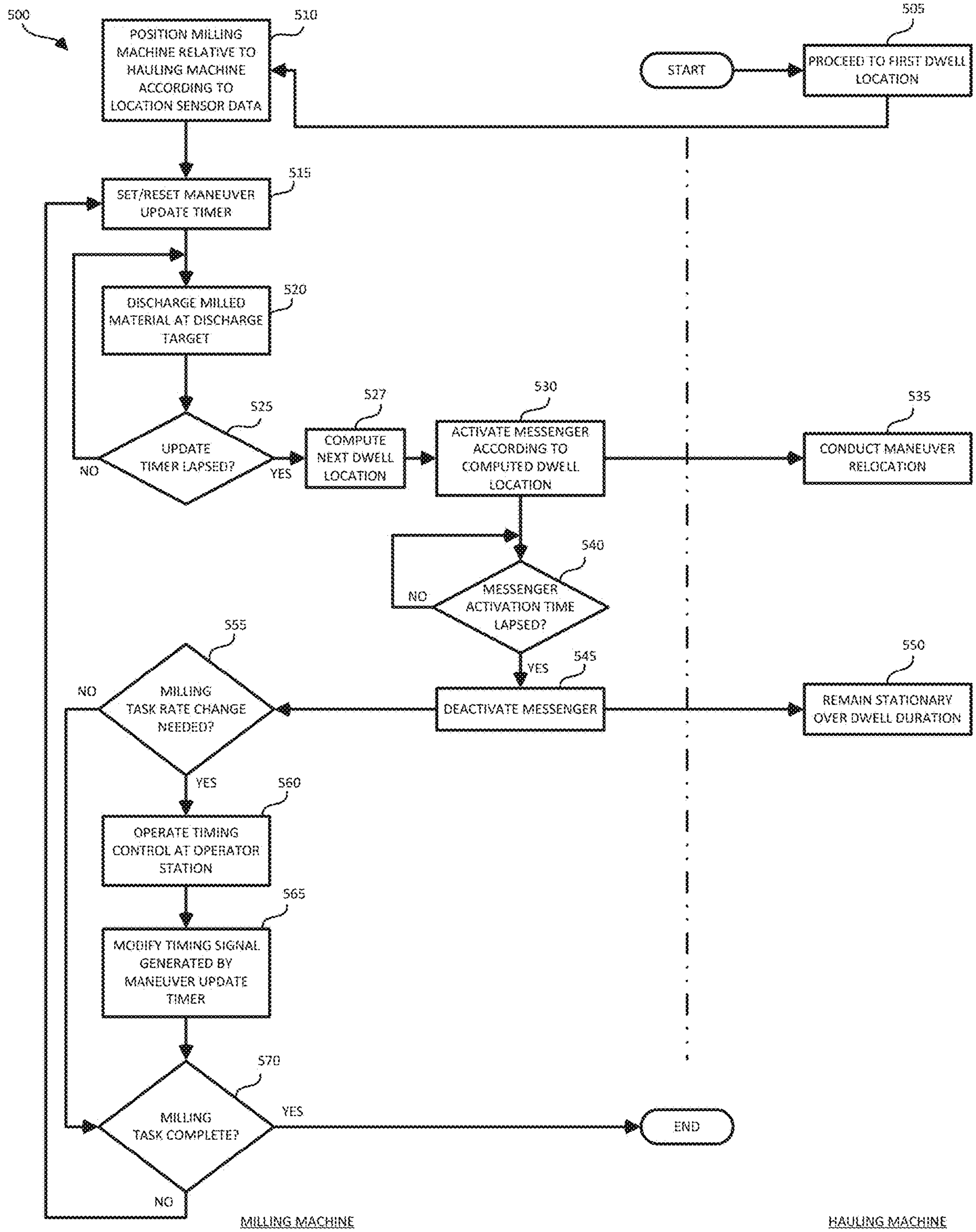
FIG. 5 is a flow diagram of a coordinated maneuver process by which the present inventive concept can be embodied.

FIG. 5 is a flow diagram of a coordinated maneuver process 500 by which the present inventive concept can be embodied.

At operation 505, the hauling machine (e.g., 18) may proceed to the first dwell location of the coordinated maneuver and, in operation 510, the milling machine (e.g., 10) may be positioned relative to the hauling machine according to location sensor data. In operation 515, the maneuver update timer may be set to selected timing signal parameters and in operation 520, milled material may be discharged towards a discharge target in the hauling machine. In operation 525, it may be determined whether the maneuver update timer has changed states. If not, coordinated maneuver process 500 may transition to operation 520 by which milled material continues to be discharged. If it is determined at operation 525 that the maneuver update timer has changed states, coordinated maneuver process 500 may transition to operation 527 by which the next dwell location is computed. In operation 530, a messenger is activated to display, for example, instructions to reach the next dwell location. The activated messenger is detected by the hauling machine, which conducts a maneuver relocation in response at operation 535. In operation 540, it may be determined whether the messenger activation time has lapsed, which may correspond to maneuver update timer once again changing state. Coordinated maneuver process 500 may remain at operation 540 until the messenger activation time has lapsed, at which time coordinated maneuver process 500 may transition to operation 545 by which the messenger is deactivated prompting the hauling machine in operation 550 to remain stationary over a dwell duration that continues until the maneuver update timer changes state once again.

In operation 555, it may be determined whether the rate at which the milling task is performed requires modification. If so, coordinated maneuver process 500 may transition to operation 560 at which a timing control is operated at the milling machine operator station. In operation 565, a timing signal generated by the maneuver update timer and that changes state therewith may be modified in accordance with parameters established through the timing control. If, at operation 555, it is determined that the milling task rate is acceptable or by transition from operation 565, coordinated maneuver process 500 may proceed to operation 570 by which it is determined whether the milling task has been completed. If so, coordinated maneuver process 500 may terminate. If, however, it is determined that the milling task is not complete, coordinated maneuver process 500 may return to operation 520 and continue the milling task from that point.

Certain embodiments of the present general inventive concept provide for the functional components to be manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

INDUSTRIAL APPLICABILITY

Certain construction activities, such as road surface milling, require coordination among the machines that perform those activities. Shortcomings in achieving such coordination typically result in productivity losses, such as requiring extra time when compared with optimal coordination, waste of fuel, increased carbon gas emissions among others. Signaling from one machine to another is often achieved through human gestures and the understanding thereof by the machine operators. The present inventive concept provides for such signaling through the use of messengers, the timing of the activation and deactivation of which being defined by a timing signal having operator selectable parameters. The timing signal thus may provide rate control over a coordinated maneuver among the machines during which the activities are performed. This rate control is intended to increase productivity and to minimize the productivity losses previously described.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A milling machine constructed to discharge milled pavement material through a chute of a discharge port at a moving discharge target in a coordinated maneuver during which the moving discharge target is movable but confined within a bounded area defined by a bed of a haul truck, milling operations of the milling machine to produce the milled pavement material being performed during the coordinated maneuver, the milling machine comprising:

distance control mechanism circuitry constructed to select path information to a dwell location of a plurality of dwell locations of the coordinated maneuver for the moving discharge target in the bounded area defined by the bed of the haul truck;

sensors constructed to generate respective signals by which a position of a distal end of the chute of the discharge port relative to the bounded area defined by the bed of the haul truck is indicated during the coordinated maneuver;

messenger circuitry constructed to indicate the selected path information for relocation of the bounded area defined by the bed of the haul truck relative to the distal end of the chute according to a next dwell location of the plurality of dwell locations; and control circuitry configured to output a control signal to the haul truck to control autonomous operation of the haul truck to move the moving discharge target in the bounded area defined by the bed of the haul truck relative to the distal end of the chute of the discharge port according to the coordinated maneuver and based on the selected path information indicated by the messenger circuitry, wherein the dwell location corresponds to autonomous stopping of the moving discharge target relative to the distal end of the chute of the discharge port as part of a predetermined repeating pattern of autonomous moving and stopping the moving discharge target relative to the distal end of the discharge port for the coordinated maneuver, the autonomous operation of the haul truck for the relocation of the discharge target from the dwell location to the next dwell location being performed responsive to expiration of a predetermined amount of time at the dwell location.

2. The milling machine of claim 1 further comprising:

an update timer circuitry constructed to generate a timing signal that is compliant with operator selectable signal parameters, the update timer circuitry being communicatively coupled to the messenger circuitry and constructed to change a state of the messenger in accordance with a state of the timing signal; and a maneuver timing control circuitry at an operator station thereof by which the signal parameters are modified to control performance of the coordinated maneuver in accordance with the state of the timing signal, wherein the timing signal includes the predetermined amount of time at the dwell location.

3. The milling machine of claim 2, wherein the maneuver timing control circuitry is constructed to define the state of the timing signal through the signal parameters, the state of the timing signal including an activation state and a deactivation state that establish the state of the messenger.

4. The milling machine of claim 1, wherein the sensors include a contact location sensor constructed to generate a signal indicative of contact with structure of the bed of the haul truck on which the bounded area is defined.

5. The milling machine of claim 1, wherein the sensors include a noncontact location sensor constructed to generate a signal indicative of distance to the bounded area.

6. The milling machine of claim 1, wherein the control circuitry is configured to change a milling rate of the milling machine for a next iteration of the predetermined repeating pattern of autonomous moving and stopping the moving discharge target relative to the distal end of the discharge port for the coordinated maneuver.

7. A system constructed to perform a coordinated maneuver among a plurality of work machines, the system comprising:

a work machine comprising one of the plurality of work machines including:

an update timer circuitry constructed to generate a timing signal that is compliant with operator selectable signal parameters;

a messenger circuitry communicatively coupled to the update timer and constructed to change a messenger state in accordance with a state of the timing signal defined by the signal parameters;

sensors constructed to generate respective signals by which a position of the work machine relative to another work machine of the plurality of work machines is indicated during the coordinated maneuver between the work machine and the another work machine, where the another work machine traverses a trajectory over which the coordinated maneuver is performed, in response to an output of the messenger circuitry, as individual maneuver relocations and interposing dwell locations at which the another work machine is stationary relative to the work machine to relocate a discharge target within a bounded area defined by a receptacle of the another work machine; and control circuitry configured to output a control signal to the another work machine to control autonomous operation of the another work machine to relocate the discharge target according to the individual maneuver relocations and interposing dwell locations, the autonomous operation of the another work machine for the relocation of the discharge target to a next dwell location of the interposing dwell locations being performed responsive to expiration of a predetermined amount of time at a dwell location immediately prior to the next dwell location.

8. The system of claim 7 further comprising a maneuver timing control circuitry at an operator station thereof by which the signal parameters are modified to control performance of the coordinated maneuver.

9. The system of claim 8, wherein the maneuver timing control circuitry is constructed to define the state of the timing signal through the signal parameters, the state of the timing signal including an activation state and a deactivation state that establish the messenger state.

10. The system of claim 7, wherein the sensors include a contact location sensor constructed to generate a signal indicative of contact with structure of the another work machine on which the bounded area is defined.

11. The system of claim 7, wherein the sensors include a noncontact location sensor constructed to generate a signal indicative of distance to the bounded area.

12. The system of claim 7, wherein the work machine is a milling machine and the another work machine is a hauling machine constructed to capture milled material from the milling machine according to the individual maneuver relocations and interposing dwell locations, and wherein the milled pavement material is continuously discharged during a predetermined repeating pattern of moving and stopping the moving discharge target according to the individual maneuver relocations and interposing dwell locations for the coordinated maneuver.

13. A method of performing a coordinated maneuver among a plurality of work machines comprising:

generating, at a first work machine of the plurality of work machines, a timing signal that is compliant with operator selectable signal parameters;

activating, at the first work machine, a messenger circuitry in accordance with a state of the timing signal defined by the signal parameters, and deactivating, at the first work machine, the messenger circuitry in accordance with another state of the timing signal defined by the signal parameters;

propelling a second work machine of the plurality of work machines to follow a trajectory over which the coordinated maneuver is performed, in response to the messenger circuitry, as individual maneuver relocations and interposing dwell locations at which the second work machine is stationary relative to a discharge source of material to be discharged toward a discharge target defined by a bounded receptacle of the second work machine; and selectively providing the material at the discharge target within the bounded receptacle of the second work machine relative to the first work machine from which the material is discharged according to the individual maneuver relocations and interposing dwell locations and coordinated maneuver between the first and second work machines according to the trajectory, wherein said propelling the second work machine pursuant to the individual maneuver relocations and interposing dwell locations includes moving the second work machine to move to a next dwell location of the interposing dwell locations responsive to expiration of a predetermined amount of time at the dwell location in accordance with the the timing signal generated at the first work machine.

14. The method of claim 13 further comprising:

modifying the timing signal to control performance of the coordinated maneuver by the second work machine from an operator station of the first work machine.

15. The method of claim 13 further comprising:

generating respective signals at sensors disposed on the first work machine by which the position thereof relative to the second work machine is indicated during the coordinated maneuver over which the discharge target is relocated.

16. The method of claim 14 further comprising:

discharging the material from a discharge port at a distal end of a chute of a milling machine implementing the first work machine.

17. A system constructed to perform a coordinated maneuver among a pair of work machines, the system comprising:

a work machine including:

a distance control circuitry constructed to select path information to a dwell locations of the coordinated maneuver between the pair of work machines;

sensors constructed to generate respective signals by which a position of a chute of a discharge port relative to a bounded area is indicated during the coordinated maneuver between the pair of work machines;

a messenger circuitry constructed to indicate the selected path information for relocation of the bounded area according to a next dwell location of the plurality of dwell locations; and a transmitter that is constructed to transmit the selected path data;

control circuitry configured to output a control signal to control autonomous relocation of the discharge target according to the coordinated maneuver and the plurality of dwell locations; and another work machine including:

a receiver constructed to receive the selected path data; and an automatic drive communicatively coupled to the receiver and constructed to propel the other work machine to the plurality of dwell locations in accordance with the selected path data, wherein each of the plurality of dwell locations corresponds to stopping of the discharge target relative to the another work machine as part of a predetermined repeating pattern of moving and stopping the discharge target relative for the coordinated maneuver, and wherein the propelling of the anther work machine pursuant to the individual maneuver relocations and interposing dwell locations includes moving the another work machine to move to a next dwell location of the interposing dwell locations responsive to expiration of a predetermined amount of time at the dwell location in accordance with a timing signal defining the individual maneuver relocations and interposing dwell locations generated at the work machine.

* * * * *